(12) United States Patent
Schroeter et al.

(10) Patent No.: US 9,443,312 B2
(45) Date of Patent: Sep. 13, 2016

(54) LINE PARAMETRIC OBJECT ESTIMATION

(71) Applicant: Leica Geosystems AG, Heerbrugg (CH)

(72) Inventors: Derik Schroeter, Heerbrugg (CH); Gregory Walsh, Walnut Creek, CA (US)

(73) Assignee: LEICA GEOSYSTEMS AG, Heerbrugg (CH)

( * ) Notice: Subject to any disclaimer, the term of this patent is extended or adjusted under 35 U.S.C. 154(b) by 190 days.

(21) Appl. No.: 14/473,507

(22) Filed: Aug. 29, 2014

(65) Prior Publication Data

US 2016/0063716 A1 Mar. 3, 2016

(51) Int. Cl.
*G06K 9/00* (2006.01)
*G06T 7/00* (2006.01)
*G06T 15/08* (2011.01)

(52) U.S. Cl.
CPC ......... *G06T 7/0057* (2013.01); *G06K 9/00201* (2013.01); *G06T 15/08* (2013.01); *G06T 2207/10028* (2013.01); *G06T 2210/61* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 4,794,262 A * | 12/1988 | Sato | ................... | G01B 11/2518 250/559.05 |
| 5,646,859 A * | 7/1997 | Petta | ....................... | B25H 7/00 29/407.1 |
| 5,694,203 A * | 12/1997 | Ogawa | ..................... | G01C 3/08 348/31 |
| 6,069,700 A * | 5/2000 | Rudnick | .............. | G01B 11/002 356/496 |
| 6,420,698 B1 * | 7/2002 | Dimsdale | .............. | G01S 7/4811 250/205 |
| 6,724,467 B1 * | 4/2004 | Billmers | ............... | G01S 17/107 348/164 |
| 6,931,364 B1 * | 8/2005 | Anturna | ............. | G06F 17/5004 345/420 |
| 7,317,456 B1 * | 1/2008 | Lee | ......................... | G06T 15/08 345/427 |
| 7,834,985 B2 * | 11/2010 | Morcom | ................. | G01S 17/08 356/5.03 |
| 9,064,165 B2 * | 6/2015 | Havens | ............. | G06K 7/10831 |
| 9,098,773 B2 * | 8/2015 | Huang | ................. | G06K 9/6212 |
| 9,154,773 B2 * | 10/2015 | Ding | .................. | H04N 13/0275 |

(Continued)

OTHER PUBLICATIONS

Combining contour and shape primitives—parts, Alexander Berner et al., IEEE, 2013, pp. 1-5.*

(Continued)

*Primary Examiner* — Jayesh A Patel
(74) *Attorney, Agent, or Firm* — Maschoff Brennan

(57) ABSTRACT

A method may include projecting, onto a first projection plane of a first projection volume, first points from a point cloud of a setting that are within the first projection volume. Further, the method may include matching a plurality of the projected first points with a cross-section template that corresponds to a line parametric object (LPO) of the setting to determine a plurality of first element points of a first primary projected element. Additionally, the method may include projecting, onto a second projection plane of a second projection volume, second points from the point cloud that are within the second projection volume and matching a plurality of the projected second points with the cross-section template to determine a plurality of second element points of a second primary projected element. Moreover, the method may include generating a parameter function based on the first element points and the second element points.

25 Claims, 6 Drawing Sheets

(56) References Cited

U.S. PATENT DOCUMENTS

| | | | | |
|---|---|---|---|---|
| 9,163,936 B1* | 10/2015 | Ulmer | ............ | G01B 11/25 |
| 9,245,062 B2* | 1/2016 | Rueb | ............ | G01C 11/00 |
| 9,322,950 B2* | 4/2016 | Gustavsson | ............ | E21B 47/0002 |
| 2004/0233416 A1* | 11/2004 | Doemens | ............ | G01S 7/487 |
| | | | | 356/5.01 |
| 2005/0205755 A1* | 9/2005 | Walsh | ............ | G01S 7/497 |
| | | | | 250/205 |
| 2010/0050560 A1* | 3/2010 | Werner | ............ | F24J 2/14 |
| | | | | 52/693 |
| 2011/0079083 A1* | 4/2011 | Yoo | ............ | G01S 7/52065 |
| | | | | 73/632 |
| 2011/0164037 A1* | 7/2011 | Yoshida | ............ | G06T 15/08 |
| | | | | 345/419 |
| 2012/0044504 A1* | 2/2012 | Ohnishi | ............ | G01B 11/24 |
| | | | | 356/602 |
| 2014/0233804 A1* | 8/2014 | Gustavsson | ............ | E21B 47/0002 |
| | | | | 382/103 |
| 2014/0244219 A1* | 8/2014 | Pappoppula | ............ | G06F 17/5004 |
| | | | | 703/1 |
| 2014/0334554 A1* | 11/2014 | Walsh | ............ | H04N 19/85 |
| | | | | 375/240.26 |
| 2015/0003723 A1* | 1/2015 | Huang | ............ | G06K 9/6212 |
| | | | | 382/154 |
| 2015/0097828 A1* | 4/2015 | Miller | ............ | G01C 15/002 |
| | | | | 345/420 |

OTHER PUBLICATIONS

V. Stamati and I. Fudos, "Building Editable B-rep Models from Unorganized Point Clouds", Jul. 7, 2010, pp. 1-10.

V. Raja et al., "Reverse Engineering an Industrial Perspective", Jan. 1, 2008, Springer, pp. 119-139. XP002755106.

A. Protopsaltis and I. Fudos, "A Feature-Based Approach to Re-engineering CAD Models from Cross Sections", Computer-Aided Design and Applications, vol. 7, No. 5, Jan. 1, 2010, pp. 739-757.

Bundesministerium der Justiz, "General recommendations for the formulation of legislation", Commission Legal Technicality, http://hdr.bmj.de/page_b.1.html, retrieved Jun. 7, 2016, pp. 1-31.

* cited by examiner

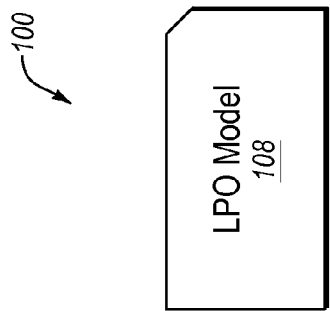
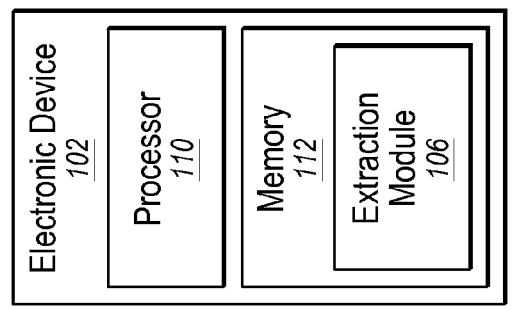

LINE PARAMETRIC OBJECT ESTIMATION

FIELD

The embodiments discussed herein are related to estimating line parametric objects (LPOs) from 3 dimensional (3D) data.

BACKGROUND

Laser scanning is used to survey many different settings such as construction sites, historical buildings, industrial facilities or any other applicable setting. The laser scanning may be used to obtain three-dimensional (3D) models of the settings.

SUMMARY

According to at least one embodiment a method may include receiving a point cloud of three-dimensional (3D) data that may correspond to a setting. The 3D data may include multiple line parametric object (LPO) points that may correspond to an LPO included in the setting. The method may further include generating a first projection volume that corresponds to a three-dimensional extension of a first projection plane. The first projection plane may include a first position along a dominant axis about which the LPO extends. Further, the first projection plane may be perpendicular to a direction axis at the first position and the direction axis may at least roughly correspond to the dominant axis. The method may also include projecting, onto the first projection plane, first points from the point cloud that are within the first projection volume. Further, the method may include matching a plurality of the projected first points with a cross-section template that corresponds to the LPO to determine a plurality of first element points of a first primary projected element. The first element points may include a first plurality of LPO points. Additionally, the method may include generating a second projection volume that includes a second projection plane and placing the second projection volume such that the second projection plane includes a second position along the dominant axis that is different from the first position. Placing the second projection volume may be based on the direction axis such that the second projection plane is moved along the direction axis with respect to the first projection plane and is perpendicular to the direction axis at the second position. The method may also include projecting, onto the second projection plane, second points from the point cloud that are within the second projection volume and matching a plurality of the projected second points with the cross-section template to determine a plurality of second element points of a second primary projected element. The second element points may include a second plurality of LPO points. Moreover, the method may include generating a parameter function based on the first element points and the second element points. The parameter function may express a parameter of the LPO as a function of position along the dominant axis.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1A is a diagram representing an example system configured to extract a model of a line parametric object (LPO) from three-dimensional (3D) data;

FIG. 1B illustrates an example electronic device that may include an extraction module of FIG. 1A;

DESCRIPTION OF EMBODIMENTS

Figure 2A:
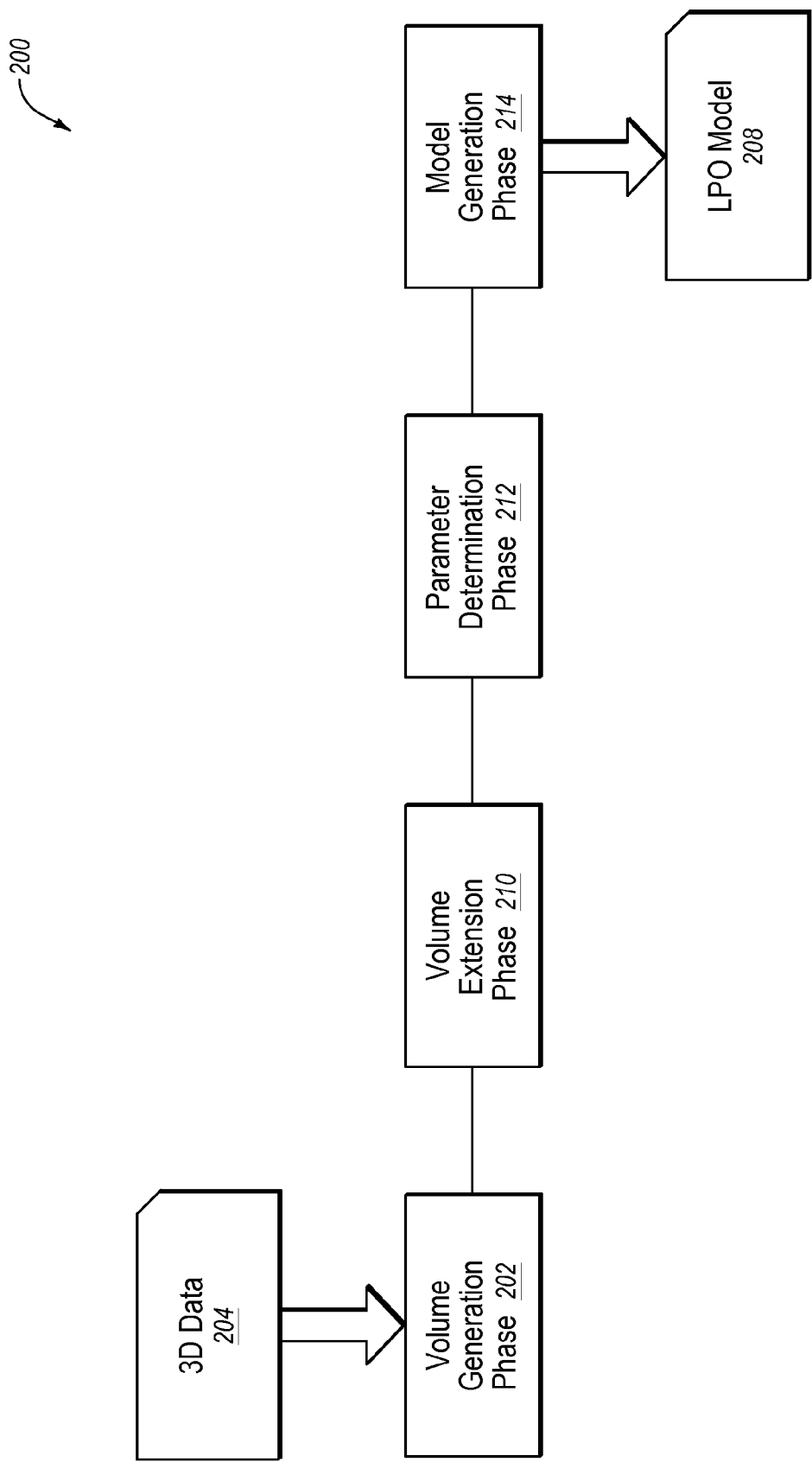
FIG. 2A is a flowchart of an example flow that may be used to extract an LPO model from 3D data.

A laser scanner may collect data about a setting by scanning the setting with a laser and collecting thousands, millions or even billions of points of three-dimensional position information associated with the setting. The points and associated information may be saved as point data, which may be collected as a "point cloud." In some embodiments, the points may be collected so densely that the associated point data may be used to effectively re-create a scene of the setting scanned by the laser scanner. In the present disclosure the term "point" may refer to a point and/or its associated point data.

As such, the point cloud may in effect include an aggregate of data that may be associated with a collection of objects that may be included in the setting. In some instances, one or more of the objects may include line parametric objects (LPO). An LPO may include a class of objects that may be characterized as having a dominant axis about which the LPO may extend. An LPO may be piecewise continuous about the dominant axis such that a cross-section of the LPO may be a function of a position about the dominant axis. As such, one or more parameters of the LPO may be expressed as a function of the position about the dominant axis. Examples of LPOs include I-beams, pipes, curbs, cable trays, etc.

In some instances, the cross-section of the LPO may vary or be substantially constant as a function of the position about the dominant axis such that the parameters may also vary or be substantially constant as a function of the position about the dominant axis. For example, a diameter of a pipe may vary or stay the same at different positions along its dominant axis about which it may extend. Further, in some instances LPOs may be substantially symmetrical about the dominant axis and in other instances LPOs may be asymmetrical about the dominant axis. For example, a particular pipe may be substantially symmetrical about its dominant axis and a curb may by asymmetrical about its dominant axis. Additionally, LPOs may extend in a substantially straight line or may include one or more curves in which the LPOs may change direction. For example, a particular pipe may be substantially straight or may include elbows or other curves that may change the direction of the pipe.

Although a point cloud may include points associated with LPOs (referred to as "LPO points") the LPO points may not be differentiated from other points in the point cloud. As such, identification of an individual LPO and its associated parameters from the point cloud may include further processing. As described in further detail below, according to one or more embodiments of the present disclosure, a model of an LPO may be extracted from 3D data included in a point cloud.

Embodiments of the present disclosure are now explained with reference to the accompanying drawings.

FIG. 1A is a diagram representing an example system 100 configured to extract a model of an LPO from a point cloud of three-dimensional (3D) data, configured according to at least one embodiment described herein. The system 100 may include an extraction module 106. The extraction module 106 may be configured to receive 3D data 104. The 3D data 104 may include any suitable data that may include information corresponding to a setting. For example, the 3D data may be part of a point cloud of the setting. In some embodiments, the point cloud may be generated by a laser scanner. However, the point cloud is not limited to 3D data that is created by a laser scanner and may include 3D data of a setting that is generated via any suitable mechanism. The extraction module 106 may be configured to extract an LPO model 108 for each of one or more LPOs that may be included in the setting that may correspond to the 3D data 104.

As detailed below, in some embodiments, the extraction module 106 may be configured to generate a projection volume for the point cloud that corresponds to a 3D extension of a projection plane. The projection volume may include a 3D space within the setting that may be represented by the 3D data 104. The projection plane may include a position along a dominant axis of an LPO and may be perpendicular to a direction axis that at least roughly corresponds to the dominant axis. For example, the direction axis may at least roughly run in-line with the dominant axis. The extraction module 106 may be configured to project, onto the projection plane, points from the point cloud that are within the projection volume. In some embodiments, the extraction module 106 may be configured to project all the points from the point cloud that are within the projection volume onto the projection plane.

The extraction module 106 may also be configured to match at least a set of the points that may be projected onto the projection plane (referred to as "projected points") with a cross-section template that corresponds to the LPO. The cross-section template may include a generic cross-sectional shape of the LPO. Therefore, the matching of projected points with the cross-section template may be used to determine which of the projected points form a shape that at least roughly matches the shape of the cross-section template. As such, the projected points that at least roughly match the shape of the cross-section template may correspond to the LPO and may include multiple LPO points. The projected points that at least roughly match the shape of the cross-section template and their associated cluster shape may be referred to as a "primary projected element" that includes "element points" where the element points may include multiple LPO points.

As such, the extraction module 106 may be configured to determine the primary projected element, and consequently a set of LPO points, by matching the element points with the cross-section template. The extraction module 106 may be configured to perform similar operations at one or more other positions along the dominant axis to determine multiple projected elements and corresponding element points.

As indicated above and described below, the matching of the points with the cross-section template may occur with respect to different projection planes that may intersect different positions along the dominant axis. Therefore, a position of a projection plane may also be deemed as indicating a position of the cross-template model such that the cross-template model may be considered as being moved along or tracking the LPO according to the different positions of the projection planes along the dominant axis.

As detailed below, the extraction module 106 may also be configured to determine coordinate transformations of the element points with respect to each of their respective positions along the dominant axis of the LPO. The coordinate transformations may indicate a transformation from a global coordinate system that may correspond to the setting represented by the point cloud to a local coordinate system that may correspond to the dominant axis.

For example, the local coordinate system may be such that the dominant axis is at the center of the local coordinate system and the global coordinate system may be based on a central location in the setting. Therefore, the coordinate transformations may indicate the transformation of the coordinates of the associated element points from being based on the central location of the setting to being based on the dominant axis of the LPO.

In some embodiments, each coordinate transformation may include a translation and a rotation for the respective element points at the corresponding position along the dominant axis of the LPO. The translation and the rotation for each element point may indicate the rotation and the translation of the respective element point between the global coordinate system and the local coordinate system. In some embodiments, the translation and the rotation for each element point may each be considered parameters of the LPO because they may indicate a position, an orientation, and a direction of the LPO in the setting.

Based on the coordinate transformations and/or the element points, the extraction module 106 may be configured to determine one or more other parameters of the LPO at each associated position along the dominant axis of the LPO. The parameters may include the translation and rotation of coordinates (which may indicate location, orientation, and/or direction of the LPO), a diameter, a thickness, height, width, length, etc. of the LPO. For example, the coordinate transformations may be used to define the position, orientation, and direction of the dominant axis of the LPO. As another example, using the coordinate transformations of the element points associated with a pipe and/or using the element points themselves without the coordinate transformations, the extraction module 106 may be configured to determine a diameter of the pipe at the corresponding position along the dominant axis of the pipe.

The extraction module 106 may also be configured to determine a parameter function for one or more parameters based on the corresponding parameter determination. Each parameter function may express its corresponding parameter as a function of position along the dominant axis. For example, the extraction module 106 may be configured to determine the translation and/or rotation for the coordinate transformations at multiple positions along the dominant axis and may express the translation and/or rotation as a function of position along the dominant axis. As another example, the extraction module 106 may determine the diameter of a particular pipe at multiple positions along its dominant axis. The extraction module 106 may then be configured to generate, based on the diameters at the multiple positions, a parameter function that expresses the diameter of the pipe as a function of position along the pipe.

The extraction module 106 may be configured to generate the LPO model 108 for the corresponding LPO based on the one or more parameter functions determined for the LPO. The LPO model 108 may include a 3D model and rendering of the corresponding LPO and may indicate one or more of the parameters of the corresponding LPO. For example, based on a parameter function associated with the diameter of a pipe along its dominant axis and based on a parameter function associated with the rotation and translation (which may define the dominant axis of the pipe), a 3D model of the pipe may be generated in which the diameter of the pipe may be indicated by the model along the dominant axis of the pipe.

Therefore, the extraction module 106 may be configured to extract the LPO model 108 from the 3D data 104. According to some embodiments, the extraction module 106 may be configured to perform one or more operations of a flow 200 described below with respect to FIGS. 2A-2D

FIG. 1B illustrates an example electronic device 102 that may include the extraction module 106, according to at least one embodiment described herein. The electronic device 102 may include any suitable system, apparatus, or device configured to extract the LPO model 108 from the 3D data 104. The electronic device 102 may include a processor 110 communicatively coupled to a memory 112. In some embodiments, the extraction module 106 may be embodied in logic or instructions resident in the memory 112 for execution by the processor 110.

The processor 110 may include any suitable special-purpose or general-purpose computer, computing entity, or processing device including various computer hardware or software modules and may be configured to execute instructions stored on any applicable computer-readable storage media. For example, the processor 110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1B, it is understood that the processor 110 may include any number of processors configured to perform any number of operations. In some embodiments, the processor 110 may interpret and/or execute program instructions and/or process data stored in the memory 112.

The memory 112 may include computer-readable storage media for carrying or having computer-executable instructions or data structures stored thereon. Such computer-readable storage media may be any available media that may be accessed by a general-purpose or special-purpose computer, such as the processor 110. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 110 to perform a certain function or group of functions. The processor 110 may be located locally or remotely with respect to the location of the storage of the data.

The extraction module 106 may include instructions and data configured to cause the processor 110 to extract the LPO model 108 from the 3D data 104. As such, when the extraction module 106 is described as being configured to perform an operation, in some embodiments, the operation may be performed by the processor 110 as directed by the extraction module 106. Accordingly, the electronic device 102 may incorporate the extraction module 106 to extract the LPO model 108 from the 3D data 104. The electronic device 102 is merely an example computing system that may be configured to extract the LPO model 108 from 3D data 104. Other computing systems such as a distributed server system may also be configured to individually or collectively extract the LPO model 108 from 3D data 104.

FIG. 2A is a flowchart of an example flow 200 that may be used to extract an LPO model 208 from 3D data 204, according to at least one embodiment described herein. The flow 200 may be implemented by any suitable general-purpose or special-purpose computing device or computing system. For example, one or more operations of the method 300 may be implemented by the electronic device 102 configured to implement the extraction module 106. Additionally, the 3D data 204 and the LPO model 208 may be analogous to the 3D data 104 and the LPO model 108 described above with respect to FIG. 1A. The flow 200 may include a volume generation phase 202, a volume extension phase 210, a parameter derivation phase 212, and a model generation phase 214. Although each phase is described and illustrated in a particular order and sequence, one or more operations associated with each phase may be performed at the same time or in a different order than that described and illustrated. The particular sequence described and illustrated is merely an example.

At the volume generation phase 202, a projection volume may be generated from the 3D data 204. The projection volume may include a 3D space within a setting that may be represented by the 3D data 204. The projection volume may correspond to a 3D extension of a projection plane that may include a position along the dominant axis of a selected LPO and that may be perpendicular to a direction axis that at least roughly corresponds to the dominant axis. As such, the projection plane may intersect the selected LPO in a manner that a view of the selected LPO from the perspective of the projection plane may provide a cross-section of the selected LPO.

Figure 2B:
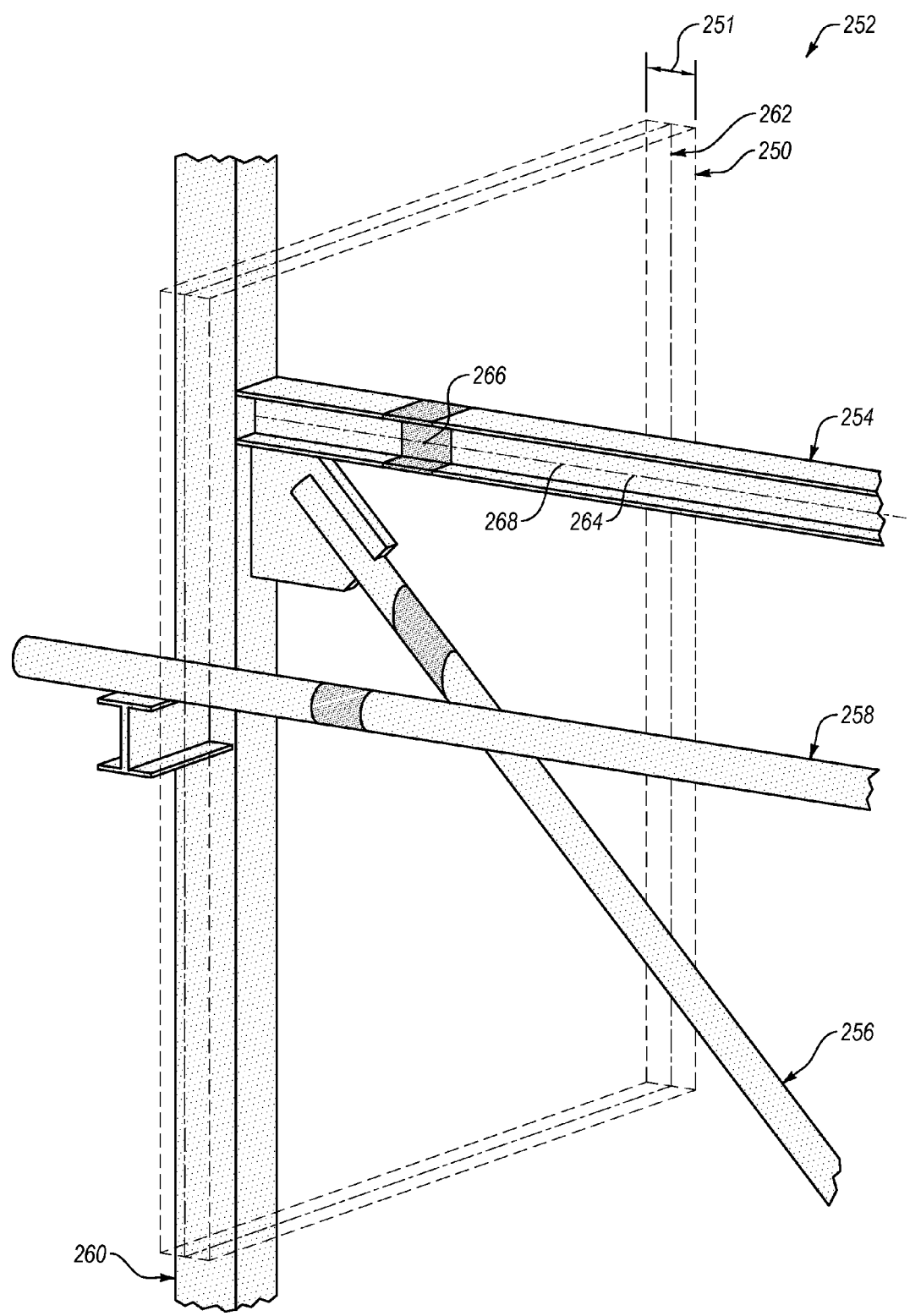
FIG. 2B illustrates an example projection volume within an example modeled setting that may be modeled from 3D data.

FIG. 2B illustrates an example projection volume 250 within an example modeled setting 252 ("setting 252") that may be modeled from the 3D data 204. The setting 252 may include an LPO 254, an LPO 256, an LPO 258, and an LPO 260. The setting 252 may include other LPOs or objects, those illustrated are for explanatory purposes only. Further, FIG. 2B merely illustrates a portion of the setting 252 that may be depicted in the 3D data 204. Further, the operations described below with respect to the setting 252, the projection volume 250 and the LPOs 254, 256, 258, and 260 may be applied generally to other settings, projection volumes, and/or LPOs.

The projection volume 250 may be an extension of a projection plane 262. In the illustrated example, the projection plane 262 may be generated based on a selected position along a dominant axis 264 of the LPO 254. In some embodiments, the selected position may be selected by a user via a user interface of an electronic device configured to perform the flow 200. The selected position may include a selected LPO point 266 that may correspond to the LPO 254. As such, the LPO 254 may be referred to as a "selected LPO." Additionally, in some embodiments, the projection plane 262 may be configured such that the selected LPO point 266 is substantially at the center of the projection plane 262. The size of the projection plane 262 may vary according to specific implementations. For example, the projection plane 262 may be defined by an XY Cartesian coordinate plane and the extension of the projection plane 262 in the X direction and/or the Y direction may vary. Further, the amount of extension in the X direction or the Y direction may vary. In some embodiments, the amount of extension about in the X or Y direction may be based on an expected size of a class of LPOs that may be targeted. In these or other embodiments, the extensions may be multiples of an expected size of the LPO.

The projection plane 262 may also be generated based on a direction axis 268 that may pass through the selected LPO point 266. For example, the projection plane 262 may be generated such that it is perpendicular to the direction axis 268. The direction axis 268 may be an axis that may at least roughly correspond to the dominant axis 264. For example, the direction axis 268 may at least roughly line-up with the dominant axis 264. In the illustrated embodiment, the direction axis 268 may substantially line-up with the dominant axis 264 such that the direction axis 268 and the dominant axis 264 may be indicated by the same line.

The direction axis 268 may be generated based on a user input in some embodiments. For example, in some embodiments, a user may indicate, via the user interface, a direction from the selected LPO point 266. The direction axis 268 may be generated from the line that may be formed from the selected LPO point 266 in the indicated direction. As another example, the user may select another LPO point along the dominant axis 264 and the direction axis 268 may be generated as including the line between the selected LPO point 266 and the other point.

The projection volume 250 may be generated as a 3D extension of the projection plane 262 along the direction axis 268. For example, when the projection plane 262 is represented by an XY Cartesian coordinate plane that is perpendicular to the direction axis 268, the direction axis 268 may correspond to an associated Cartesian coordinate Z axis in which the projection plane 262 may be repeated along the Z axis to generate the projection volume 250. In some embodiments, the extension of the projection plane 262 may extend from the selected LPO point 266 in the indicated direction used to generate the direction axis 268. In these or other embodiments, the extension of the projection plane 262 may extend from the selected LPO point 266 opposite the indicated direction. The size of the projection volume 250 with respect to the extension of the projection plane 262 along the direction axis 268 may be referred to as the "thickness" of the projection volume 250. For example, the projection volume 250 may have a thickness 251.

The projection volume 250 may include multiple points that may be included in the point cloud. In some embodiments, points that may be included in the projection volume 250 may be projected onto the projection plane 262. In some of these embodiments, all the points that may be included in the projection volume 250 may be projected onto the projection plane 262. Projection onto the projection plane 262 may include moving the points in the projection volume 250 with respect to the direction axis 268 until the points are all located in the same position along the direction axis 268 as the projection plane 262. As another example, using a Cartesian coordinate system in which the direction axis is the Z axis, the Z coordinates of the points within the projection volume 250 may be ignored and the X and Y coordinates of the points within the projection volume 250 may be mapped on the projection plane 262. Therefore, the points within the projection volume 250 may be converted from a 3D representation to a two-dimensional (2D) representation or 2D map.

In some embodiments, the points that are projected onto the projection plane 262 may be clustered to form one or more shapes based on their proximity with respect to each other. The clustering may be performed using any suitable computer vision algorithm, such as image-filtering exercises, connected component analysis, proximity analysis, and/or morphology operations. The shapes that may be formed may be referred to as "projected elements." For example, in the illustrated example of FIG. 2B, one or more of the projected elements may correspond to an LPO such as one or more of the LPOs 254, 256, and 258. Note that in the illustrated example, the projection volume 250 may not intersect the LPO 260 at any location such that the projection volume 250 may not include any points or corresponding projected elements that correspond to the LPO 260.

Figure 2C:
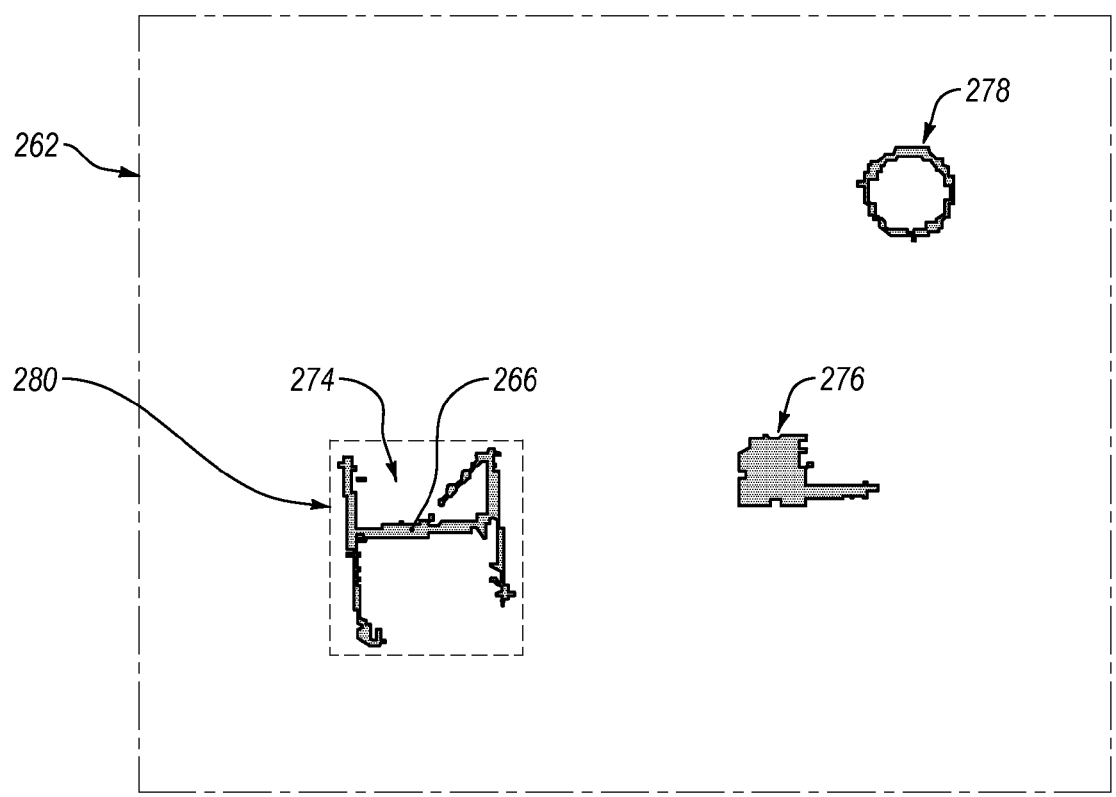
FIG. 2C illustrates an example of the projection of points onto a projection plane according to the example illustrated in FIG. 2B.

FIG. 2C illustrates an example of the projection of points within the projection volume 250 onto the projection plane 262 according to the example illustrated in FIG. 2B. In the illustrated example, the projection plane 262 may include projected thereon a projected element 274, a projected element 276, and a projected element 278. The projected element 274 may be associated with the LPO 254 and may include multiple LPO points that may correspond to the LPO 254. In the illustrated example, the projected element 274 may include the selected LPO point 266 and accordingly may be referred to as a "primary projected element." The projected element 276 may be associated with the LPO 256 and may include multiple LPO points that may correspond to the LPO 256. Additionally, the projected element 278 may be associated with the LPO 254 and may include multiple LPO points that may correspond to the LPO 254.

In some embodiments, the volume generation phase 202 may include identifying generic geometric properties of one or more of the projected elements. The identification may be performed using any suitable computer vision technique. For example, a Hough transform may be used to determine 2D lines of the projected element 274. As another example, an ellipse fitting algorithm may be used to determine curved portions of the projected element 278.

In some embodiments, the computer vision techniques described above may be performed with respect to the primary projected element (e.g., the primary projected element 274) and the other points associated with the other projected elements may be ignored. The focus on the primary projected element may be based on the user indication of interest in the primary projected element through the selection of the selected LPO point (e.g., the selected LPO point 266). In some embodiments, the volume generation phase 202 may include image filtering, morphological, connected component analysis, and/or proximity analysis operations with respect to the points that are in a relatively close proximity of the selected LPO point to determine a region-of-interest. For example, a region-of-interest 280 illustrated in FIG. 2C may be selected. In the illustrated example, the region-of-interest 280 may include the primary projected element 274. In some of these embodiments, the focus and performance of operations may be performed with respect to the points that are within the region of interest.

In some embodiments, the primary projected element (e.g., the primary projected element 274) may be matched with a cross-section template. The cross-section template may include a generic cross-sectional shape of the selected LPO. In some embodiments, the cross-section template may be derived through a user selection in which the user may select a cross-section template from a set of cross-section templates based on the user's observation of what type of LPO the selected LPO may be. For example, in the illustrated example, the user may select an I-beam cross section template because the selected LPO 254 may appear to be an I-beam.

In these or other embodiments, the cross-section template may be determined based on the generic geometric properties of the primary projected element. For example, a comparison may be made between the generic geometric properties of the primary projected element with those of one or more cross-section templates in a pre-defined set of cross-section templates. The cross-section template with geometric properties that best match the geometric properties of the primary projected element may then be selected.

In some embodiments, the points of the primary projected element ("element points") may be matched with associated parts of the cross-section template such that the primary projected element may be matched with the cross-section template. In some embodiments, the matching may be performed using shape-matching techniques and majority voting. Specifically, in some embodiment, the cross-section template may be discretized into individual points ("template points") and a translation-invariant and a scale-invariant, binary shape-descriptor may be computed for one or more of the points of the template points. Further, a translation-invariant and a scale-invariant, binary shape-descriptor may also be computed for the element points. Per-point matching between the descriptors of the element points and the descriptors of the template points may then be performed to determine likely associations between one or more of the element points and particular parts of the cross-section template. For example, the element points of the primary projected element 274 may be matched with an I-beam cross-section template to determine which of the element points may be associated with the I-beam cross-section template and at which locations. The per-point matching may also be used to explicitly or implicitly estimate a rotation angle between the primary projected element and the cross-section template.

In some embodiments, the associations may be refined by enforcing consistency with respect to the rotation angle for the element points and/or by applying majority voting with respect to clusters of element points that may be included in the primary projected element. The cross-section template may then be fitted with the element points that are deemed to be associated with the cross-section template.

In some embodiments, instead of determining the primary projected element based on the primary projected element including the selected LPO point, the primary projected element may be determined based on determining matching of the projected points with the cross-section template. In some embodiments, the matching may be performed using a descriptor matching technique such as described above to determine which projected points may be associated with the cross-section template. In these or other embodiments, the matching may be performed using an iterative closest point technique and/or a random sample consensus (RANSAC) technique to determine which projected points may be associated with the cross-section template. The projected points that are deemed to be associated with or most associated with the cross-section template may be deemed as element points and the shape that their clusters form may be deemed the primary projected element.

The thickness of the projection volume may relate to the ability to accurately cluster the points within the projection volume into one or more projected elements that at least roughly correspond to an LPO. For example, if the thickness of the projection volume is too small, the number of projected points may not be large enough to capture a cluster of points that form a shape that represents an LPO. Conversely, if the thickness of the projection volume is too large, the number of projected points may be too large such that points that correspond to different objects (e.g., an LPO and another LPO or other type of object) may be clustered together. Accordingly, in some embodiments, the thickness of the projection volume may be adjusted to obtain a target thickness.

In some embodiments, the thickness may be based on the primary projected element. For example, various thicknesses of the projection volume may be selected and the projected points surrounding the selected LPO may be clustered for the different thicknesses to generate primary projected elements of different sizes. One or more characteristics of the different primary projected elements may be measured and plotted with respect to the different thicknesses. The characteristics may have substantial changes from one thickness to another thickness even when the change in thickness is relatively small when the thickness includes not enough points or too many points indicating that the primary projected element either may not include enough points to adequately represent the selected LPO or may include points associated with other objects. Conversely, when the thickness is in a certain range, the characteristics may not change a lot when the thickness change is relatively small indicating that the primary projected element is likely associated with the selected LPO. As such, the thickness may be selected from a range of thicknesses in which a characteristic has a relatively small amount of change over the range of thicknesses.

Figure 2D:
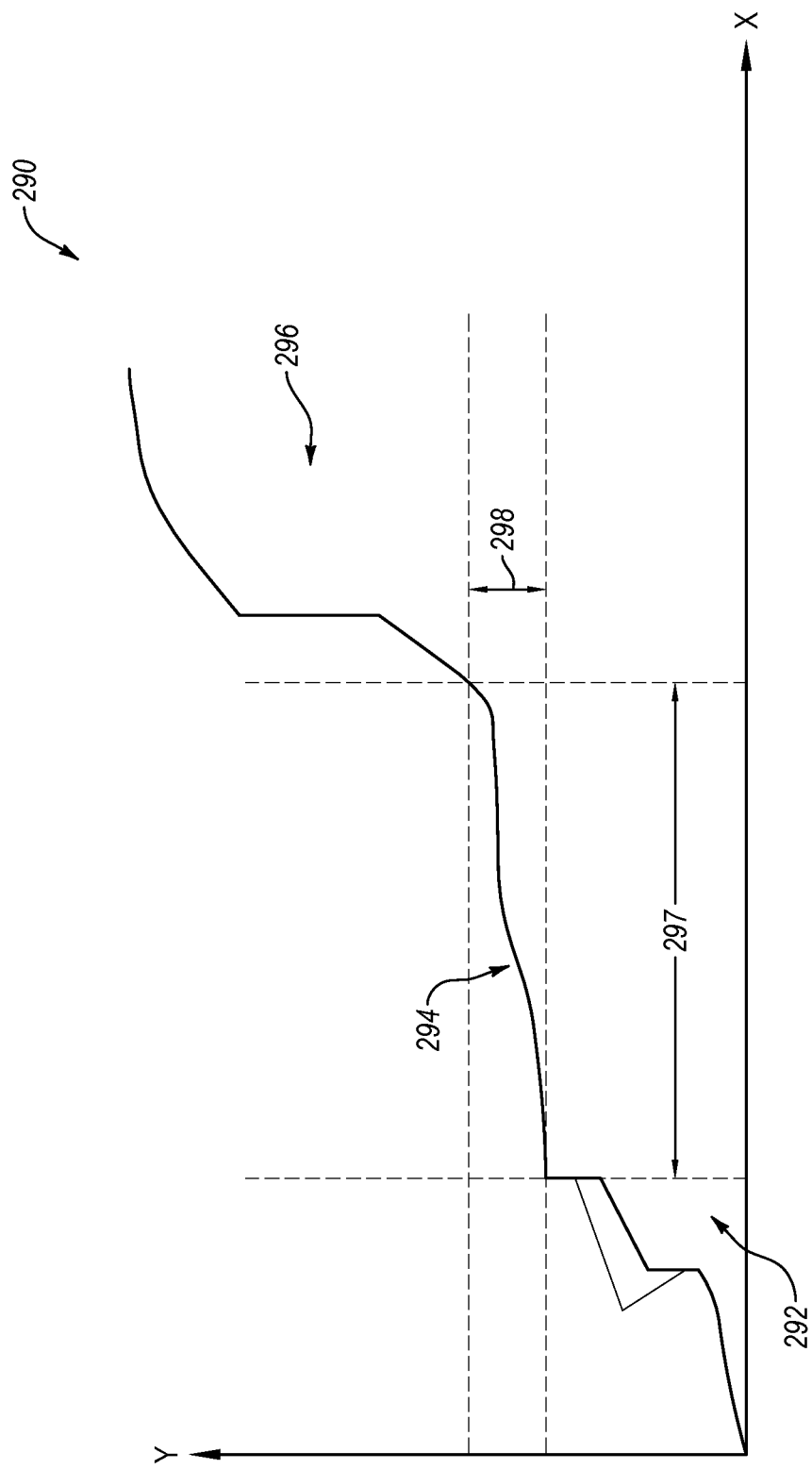
FIG. 2D illustrates a plot where a total area of a primary projected element is plotted along a Y-axis and the thickness of the corresponding projection volume is plotted along an X-axis.

For example, FIG. 2D illustrates a plot 290 where a total area of a primary projected element is plotted along the Y-axis and the thickness of the corresponding projection volume is plotted along the X-axis. As indicated in a region 292 of FIG. 2D, the area of the primary projected element may rapidly change as the thickness of the projection volume starts to increase. As indicated in a region 294, the change in area of the primary projected element may be relatively small as the thickness increases within the region 294. And, as indicated in a region 296, the change in area of the primary projected element may rapidly change again as the thickness increases within the region 296. As such, the thickness of the projection volume may be selected from within the region 294 because the change in area per change in thickness (e.g., slope) is smallest within the region 294 as compared to the regions 292 and 296. In some embodiments, the region 294 may be selected based on the change in area being within a threshold 298 over a range of thicknesses 297.

The volume extension phase 210 may include generating one or more additional projection volumes that each include a projection plane onto which points within their respective projection volumes may be projected. In some embodiments, the additional projection volumes may be generated based on the projection volume determined in the volume generation phase 202. The projection volume determined in the volume generation phase 202 may be referred to as the "primary projection volume." For example, the projection volume 250 in FIG. 2B may be referred to as a primary projection volume. In some embodiments, the additional projection volumes may be configured to have a thickness similar to or the same as the thickness of the primary projection volume.

The additional projection volumes may also be generated such that their respective projection planes are at least substantially centered about the direction axis associated with the selected LPO. Further, the additional projection volumes may be configured such that they are at least substantially perpendicular to the direction axis associated with the selected LPO. Additionally, the additional projection volumes may be configured such that the positions of their respective projection planes along the corresponding direction axis are different for each of the additional projection volumes. The positions may be in front of and/or behind the position of the primary projection volume with respect to the corresponding direction axis. Also, as indicated above, the selection of positions of the projection volumes and their associated projection planes may be used to determine placement and movement of the cross-section template.

For example, with respect to FIG. 2B, additional projection volumes associated with the selected LPO 254 may be configured such that their respective projection planes are at least substantially centered about the direction axis 268 and such that they are at least substantially perpendicular to the direction axis 268. Further, the positions of the respective projection planes of the additional projection volumes may be in different locations about the direction axis 268 with respect to each other and with respect to the position of the projection plane 262 about the direction axis 268.

The points within each projection volume may be projected onto their respective projection planes such as described above. Further, for each set of projected points associated with each additional projection volume, a primary projected element may be determined. In some embodiments, the primary projected elements may be determined based on the matching of corresponding projected points with the cross-section template, such as described above. For example, the matching may be performed using an iterative closest point technique, a random sample consensus technique, and/or a descriptor matching technique, as indicated above.

In these or other embodiments, the projected points of a first projection volume may be clustered to form one or more first projected elements. Additionally, one or more second element points from a second primary projected element of a previously determined second projection volume may be included in a first projected element of the first projection volume. Therefore, the first projected element that includes the one or more second element points may be deemed as a first primary projected element of the first projection volume. The element points of the determined first primary projected element may then be matched with the cross-section template as described above.

In some embodiments, the width (e.g., extension about a corresponding X-axis) and the height (e.g., extension about a corresponding Y-axis) of one or more of the additional projection volumes may be based on the size of the region-of-interest determined in the volume generation phase 202. As such, identification of the primary projected element associated with such additional projection volumes may be simplified. Further, in some embodiments, the parameters of the cross-section template that may be determined in the volume generation phase 202 may be used to more quickly match which projected points may correspond to the cross-section template.

In some embodiments, the additional projection volumes may be generated iteratively. As indicated above, the placement of the additional projection volumes may be with respect to the direction axis. Additionally, as discussed below, in some embodiments, the determined location of the direction axis may be adjusted based on a determined center or other template reference point of a primary projected element associated with a projection volume such that the direction axis may better align with the dominant axis of the selected LPO. As such, in some embodiments, the location for each subsequent projection volume may better track the dominant axis of the selected LPO. In some embodiments, the determined center or other template reference point for each primary projected element may be included in the parameter derivation phase 212.

For example, a first center or reference points of a first primary projected element associated with a first projection volume may be determined as described above. Additionally, a second center or reference points of a second primary projected element associated with a second projection volume generated in succession after the first projection volume may also be determined. A line that passes through the first center or reference points and the second center or reference points may be deemed as part of a corresponding direction axis such that a location and direction of the corresponding direction axis may be determined and/or adjusted based on the line that may pass through the first point and the second point. As such, a third projection volume may be generated along the corresponding direction axis with the location and direction determined based on the first center or reference point and the second center or reference point. Therefore, the location of the third projection volume may be more likely to be centered about the dominant axis of the corresponding selected LPO with which the direction axis is configured to correspond.

In these or other embodiments, the direction of the dominant axis may be assumed to be constant such that the adjustment of the direction axis may involve any part of all points that may be found to belong to the selected LPO. Therefore, in some of these embodiments, the position of a subsequent projection volume may be determined based on the assumption that the dominant axis is constant because the subsequent projection volume may be placed according to the direction axis.

In some embodiments, a subsequent projection volume may be placed based on a neighboring and previously generated projection volume such that the subsequent projection volume may include one or more element points that may correspond to a previous primary projected element of the previously generated projection volume. The element points that may be shared by the neighboring projection volumes (referred to as "shared points") may allow for a faster identification of a primary projected element associated with the subsequent projection volume. Additionally, the shared points may allow for a more accurate determination of the primary projected element.

Additionally or alternatively, in some embodiments, a subsequent projection volume and associated projection plane may be placed based on a neighboring and previously generated projection volume such that the subsequent projection volume may not include one or more element points that may correspond to a previous primary projected element of the previously generated projection volume. In these or other embodiments, a subsequent projection volume may be randomly placed along the direction axis.

Additionally or alternatively, a subsequent projection volume and associated projection plane may be placed based on the cross-section template model and a previous primary projected element. For example, if the cross-section template is determined to be a circle and the primary projected element is an ellipse shape, it may be determined that the corresponding LPO may be curving in a direction that corresponds to the ellipse. As such, the subsequent projection volume may be placed according to the determined curving. In some embodiments, the direction axis may be adjusted to account for the determined curving and the subsequent projection volume may be placed along the adjusted direction axis.

Therefore, in some embodiments, the placing of the projection volumes and their associated projection planes with respect to the direction axis may also place the cross-section template at multiple positions along the dominant axis of the selected LPO such that the cross-section template may be tracked along the selected LPO.

In some embodiments, a quality metric may be applied to the matching of one or more of the primary projected elements with the cross-section template. When the quality metric does not meet a target threshold for a particular primary projected element, which may indicate that the particular primary projected element may not correlate well with the selected LPO, one or more characteristics of the associated projection volume may be modified. For example, in some embodiments, the location, thickness, width, and/or height of the associated projection volume may be modified. After the modification, a subsequent primary projected element may be determined and matched with the cross-section template and the quality metric may be applied to the matching. In some embodiments, this may occur one or more times until the quality metric meets the target threshold. In some embodiments, the changes may be made based on a RANSAC or any other suitable search technique until the quality metric meets the target threshold.

In some instances, the quality metric may not meet the target threshold after one or more modifications, which may indicate that an end of the selected LPO has been reached. As such, in some embodiments, when the quality metric is not met, it may be determined that the selected LPO has ended. In these and other embodiments, a search algorithm may be performed with respect to one or more projection volumes where the quality metric has been met to determine where the LPO may terminate along the direction axis.

For example, an end projection volume may be incrementally moved along the direction axis from a last projection volume that is furthest along the direction axis and that also includes a last primary projected element with a quality metric that satisfies the target threshold. The incremental movements may be such that the end projection volume may include one or more element points of a neighboring primary projected element until the associated quality metric does not satisfy the target threshold. Thus, it may be determined that the selected LPO has terminated. In some embodiments, a binary or other suitable search method may be used to locate the point along the direction axis at which the threshold may not be satisfied and consequently a terminus of the selected LPO. The terms "end" and "last" in the above example are used to differentiate between projection volumes and may not mean the absolute "end" and "last" projection volumes determined.

The parameter derivation phase 212 may include one or more operations associated with determining one or more parameters of the selected LPO. Although the parameter derivation phase 212 is illustrated as following the volume generation phase 202 and the volume extension phase 210, one or more operations of the parameter derivation phase 212 may be performed in conjunction with the volume generation phase 202 and/or the volume extension phase 210. As such, the illustrated order is not limiting and strict. For example, the parameter derivation phase 212 may include one or more operations with respect to the center determination, the direction axis adjustment, and/or the cross-section characteristic determinations described above.

In some embodiments, the parameter derivation phase 212 may include determining a center point or other template reference point for each of the primary projected elements of each of the projection volumes. In some embodiments, the center or reference points may be determined based on a comparison with the cross-section template.

For example, from the matching of the element points with the cross-section template, a center or other reference of the primary projected element may be determined. In these or other embodiments, an interpolation may be performed with respect to the points to determine a line that may be used as the direction axis. As such, the location of the direction axis may be determined such that it may run through the determined reference point of the primary projected element. In some embodiments, the interpolation may include a spline interpolation. Additionally, depending on the selected LPO, the direction axis may include a substantially straight line, a curved line, and/or a piecewise continuous line. As indicated above, the direction axis may correspond to the dominant axis of the selected LPO and the dominant axis of the selected LPO may run through the center or reference point of a cross-section of the selected LPO. Consequently, by determining the center or reference points of the primary projected elements and determining the direction axis based on the center or reference points the location, orientation, and direction of the dominant axis of the LPO may be estimated by the location, orientation, and direction of the direction axis.

In some embodiments, the interpolation may include an assumption that the dominant axis is a substantially straight line whereas in other embodiments the interpolation may include an assumption that the dominant axis may include one or more curved segments. Further, in some embodiments, the interpolation may include segments characterized by splines.

In some embodiments, the points that intersect and/or are in relatively close proximity to the direction axis may be determined (referred to as "direction axis points"). The corresponding coordinates of the direction axis points with respect to a global coordinate system associated with the point cloud may also be determined. Based on these coordinates, in some embodiments, a position of the direction axis in the setting may be determined such that an estimated position of the dominant axis of the selected LPO may also be determined.

In these or other embodiments, the parameter derivation phase 212 may include operations associated with determining a coordinate transformation for one or more element points associated with the primary projected elements. In some embodiments, the coordinate transformations may be performed for each element point. As described above, the coordinate transformations may indicate a transformation from a global coordinate system that may correspond to the setting represented by the point cloud to a local coordinate system that may correspond to the dominant axis of the selected LPO, which may be determined based on the direction axis. As such, as described above, the coordinate transformation may be such that the direction axis is at the center of the local coordinate system. Therefore, the dominant axis may also be substantially at the center of the local coordinate system. Additionally, the coordinate transformations may also indicate the position, orientation, and/or direction of the direction axis and the dominant axis such that the coordinate transformations themselves may help define the dominant axis.

In some embodiments, the interpolation and center determination may be used to adjust a previously determined position, orientation, and/or direction of the direction axis such that it may better correspond to the dominant axis. For example, the direction axis may be previously determined (e.g., based on an initial user input) such that the direction axis is not aligned with the line determined during the interpolation. As such, the position, orientation, and/or direction of the direction axis may be adjusted such that the direction axis may better align with the interpolated line. The adjustment may consequently further align the direction axis with the corresponding dominant axis.

In these and other embodiments, the projection volumes may also be adjusted based on the adjustment of the direction axis. For example, a direction of the direction axis may be adjusted and, as indicated above, previously generated projection volumes may have been oriented such that their corresponding projection planes were at least substantially perpendicular to the direction axis before the adjustment of the direction axis. As such, the adjustment of the direction of the direction axis may be such that one or more projection planes may no longer be at least substantially perpendicular to the direction axis. Therefore, an orientation of one or more of the projection volumes may be adjusted according to the direction adjustment of the direction axis such that their corresponding projection planes may also be adjusted such that the corresponding projection planes may again be at least substantially perpendicular to the direction axis. In these or other embodiments, the determination and matching of the corresponding primary projection elements may be performed again with respect to the adjusted projection volumes, which may improve the matching of the primary projected elements to the cross-section template and accordingly the selected LPO.

In some embodiments, the interpolation, coordinate transformations, direction axis adjustment, projection volume adjustment, and matching may be repeated multiple times to improve the precision with which the selected LPO may be modeled. In these or other embodiments, one or more of the operations may be repeated until a target convergence point is reached. In other embodiments, the process may be performed only once to increase speed in which the line interpolation originally determined may be determined as adequately representing the dominant axis.

In some embodiments, the parameter derivation phase 212 may include operations associated with determining one or more parameters of the cross-section template. For example, orientation, thickness, width, height, diameter, etc. may be determined for the cross-section template based on points that are matched for the cross-section template. The parameters of the cross-section template may be used in the volume extension phase 210 to help identify primary projected elements associated with the additional projection volumes. In these or other embodiments, one or more parameters of the cross-section template (e.g., the orientation) at one or more associated positions along the dominant axis may also be adjusted based on adjustments to the direction axis, coordinate transformations, projection volumes, projection planes, etc. Further, as indicated above, adjustment of the projection volumes and projection planes and their associated positions with respect to the dominant axis may also result in adjustment of the tracking of the cross-section template and its positions along the dominant axis in some instances.

The parameter derivation phase 212 may also include one or more operations associated with determining one or more parameters of the selected LPO. As indicated above, the parameters may include the translation and rotation of coordinates (which may indicate location, orientation, and/or direction of the LPO), a diameter, a thickness, height, width, length, etc. of the LPO. Further, the parameter derivation phase 212 may include operations in which one or more of the parameters may be determined at one or more positions along the dominant axis of the selected LPO based on the coordinate transformations and/or the element points associated with each of the positions.

The parameter derivation phase may also include one or more operations configured to determine a parameter function for one or more of the parameters based on the corresponding parameter determination in which each parameter function may express its corresponding parameter as a function of position along the dominant axis. For example, the translation and/or rotation for the coordinate transformations at multiple positions along the dominant axis may be determined and may be expressed as a function of position along the dominant axis.

In these or other embodiments, the parameter derivation phase 212 may include one or more operations associated with determining a certainty of the determined parameter at each corresponding position along the dominant axis. The certainty may indicate how accurate the determination of the parameter may be at the corresponding position. In some embodiments, it may be based on how well the corresponding element points were associated with the cross-section template, a number of corresponding element points that associated with the cross-section template, etc. In these or other embodiments, the certainty may also be expressed as a function of position along the dominant axis such that at any given point along the dominant axis it may be determined how accurate the corresponding parameter determination may be. In some embodiments, the certainty at a particular position may be based on an interpolation and/or surrounding points that are likely LPO points at the particular position. In some embodiments, the certainty may be expressed as a mean error of the points determined as LPO points or a standard deviation of the points determined as LPO points. The mean and standard deviations may be calculated with respect to the LPO surface. Locally the points which determine the surface may have mean error and as such may have a standard deviation to the fit, as the fit may be determined over a larger area than locally.

The model generation phase 214 may include one or more operations that correspond to generating the LPO model 208 based on the one or more parameter functions determined for the selected LPO. The LPO model 208 may include a 3D model and rendering of the selected LPO and may indicate one or more of the parameters of the selected LPO.

In some embodiments, the model generation phase 214 may include operations associated with indicating an accuracy or "fit quality" of the LPO model 208. For example, in some embodiments, the model generation phase 214 may include operations associated with applying a texture map with colored pixels to the LPO model 208. The different colors may indicate a number of points (e.g., LPO points) at a particular location along the selected LPO that may support the representation of the selected LPO at that point. In these or other embodiments, the different colors may be based on the determined certainty (e.g., the standard deviation and/or mean error). Additionally or alternatively, the coloring may indicate the actual points that have been determined as LPO points in generating the LPO model 208. As such, the different colors may indicate locations where the representation of parameters of the selected LPO may be based more on interpolation conjecture than real data.

Therefore, the flow 200 may be configured to extract the LPO model 208 from the 3D data 204. Modifications, additions, or omissions may be made to the flow 200 without departing from the scope of the present disclosure. For example, as indicated above, the order of performance of the operations may vary as compared to the order of presentation and explanation given. Additionally, one or more of the operations may include more or fewer operations than those described.

Figure 3:
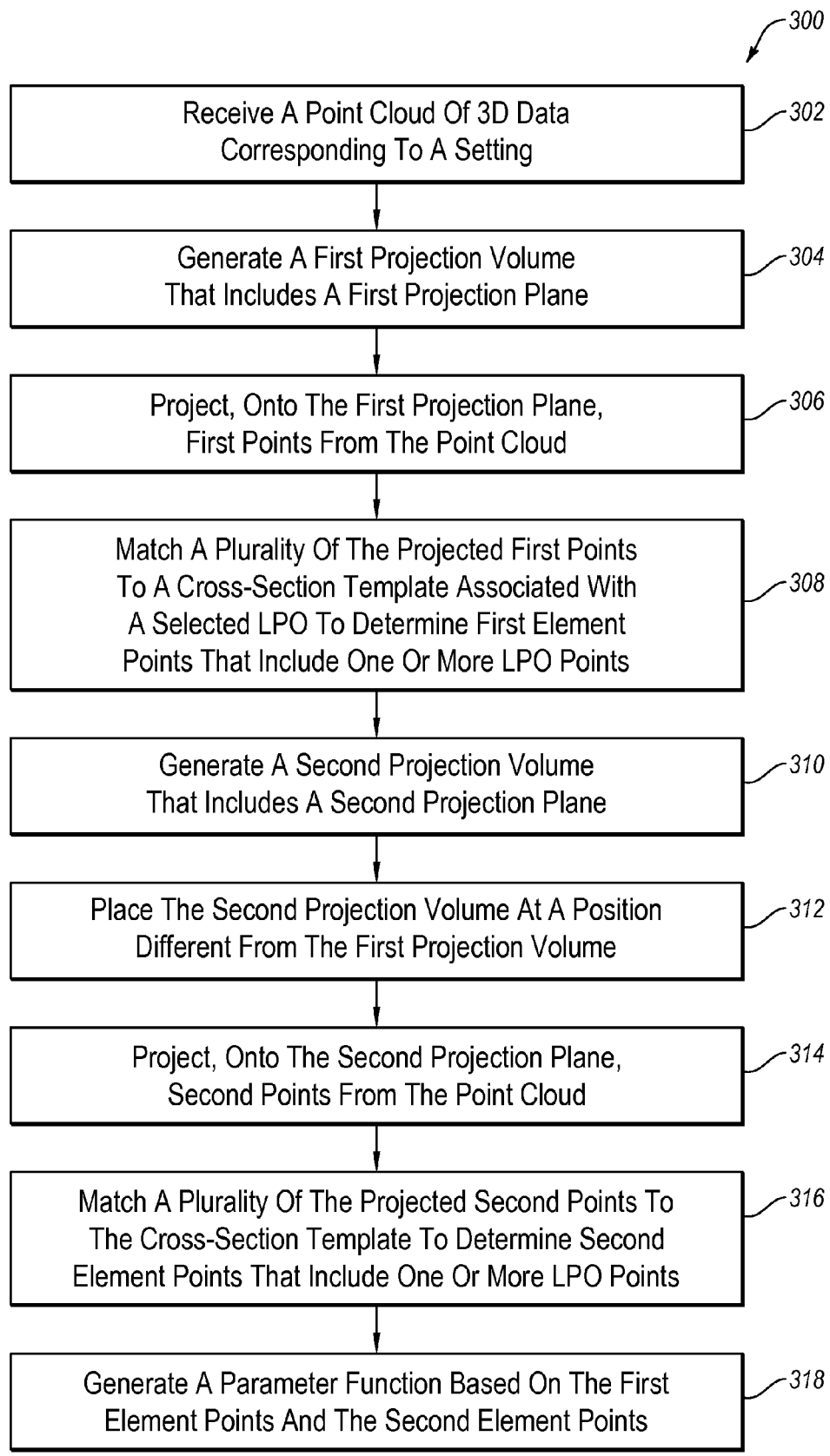
FIG. 3 is flowchart of an example method of extracting an LPO parameter from 3D data.

FIG. 3 is flowchart of an example method 300 of extracting one or more parameters of an LPO from 3D data, arranged in accordance with at least one embodiment described herein. The method 300 may be implemented by any suitable general-purpose or special-purpose computing device. For example, one or more operations of the method 300 may be implemented by the electronic device 102 configured to implement the extraction module 106. Further, the method 300 may include one or more operations that may be performed with respect to the flow 200 described above. Although illustrated as including discrete blocks, various blocks of the method 300 may be divided into additional blocks, combined into fewer blocks, or eliminated, depending on the desired implementation.

The method 300 may begin at block 302, where a point cloud of 3D data corresponding to a setting may be received. The 3D data may include multiple LPO points that correspond to an LPO included in the setting.

At block 304, a first projection volume that corresponds to a 3D extension of a first projection plane may be generated. The first projection plane may include a first position along a dominant axis about which the LPO extends. Further, the first projection plane may be perpendicular to a direction axis at the first position and the direction axis may at least roughly correspond to the dominant axis. In some embodiments, an initial point that may correspond to the LPO (e.g., an LPO point) may be received as an input and the first projection volume may be generated and positioned such that the first projection plane includes the initial point. As such, the initial point may correspond to a selected LPO point described above. Further, in these or other embodiments, an indication of the direction axis may be received as an input as described above.

Additionally, in some embodiments, a thickness of the first projection volume along the direction axis may be selected based on changes in a characteristic of the first primary projected element with respect to a position along the direction axis. In these or other embodiments, the thickness may be selected based on a least amount of change in the characteristic within a threshold thickness. For example, the thickness may be selected based on the principles described above with respect to FIG. 2D in some embodiments.

At block 306, first points from the point cloud that are within the first projection volume may be projected onto the first projection plane. At block 308, multiple first points may be matched with a cross-section template that corresponds to the LPO. The cross-section template may be received as an initial condition in some embodiments. Additionally or alternatively, the cross-section template may be determined based on selecting a candidate cross-section template that substantially matches the first primary projected element, as described above.

The matching may be performed to determine first element points of a first primary projected element. The first element points may include a first plurality of LPO points. As indicated above, in some embodiments, the first primary projected element may be determined based on a clustering of projected first points that may include a selected LPO point and then the matching may be performed. Additionally or alternatively, the matching may be used to determine the first primary projected element.

At block 310, a second projection volume that includes a second projection plane may be generated. In some embodiments, the second projection volume may be generated based on the first projection volume. For example, the second projection volume may be configured to a thickness that is substantially the same as the thickness of the first projection volume.

At block 312, the second projection volume may be placed such that the second projection plane includes a second position along the dominant axis that is different from the first position. Placing the second projection volume may be based on the direction axis such that the second projection plane is moved along the direction axis with respect to the first projection plane and is perpendicular to the direction axis at the second position.

Further, in some embodiments, the second position may be selected such that the first points and the second points include one or more of the same points from the point cloud. Additionally or alternatively, the second position may be selected such that the first points and the second points do not include one or more of the same points from the point cloud. Moreover, in some embodiments, the second position may be randomly selected and/or based on an adjustment in the direction axis. The adjustment in the direction axis may be based on a determined center of one or more previously determined primary projected elements, a characteristic of the cross-section template (e.g., a center of the cross-section template, a shape of the cross-section template, etc.) a type of fit with the cross-section template with respect to a characteristic of the cross-section template (e.g., a primary projected element with an ellipse shape that is fit with a circular cross-section template), etc.

At block 314, second points from the point cloud that are within the second projection volume may be projected onto the first projection plane. At block 316, multiple second points may be matched with the cross-section template. The matching may be performed to determine second element points of a second primary projected element. The second element points may include a second plurality of LPO points. As indicated above, in some embodiments, the second primary projected element may be determined based on a clustering of projected second points that may include previously determined LPO points (e.g., the projected second points may include one or more first element points) and then the matching may be performed. Additionally or alternatively, the matching may be used to determine the second primary projected element.

At block 318, a parameter function may be generated based on the first element points and the second element points. The parameter function may express a parameter of the LPO as a function of position along the dominant axis. In some embodiments, the parameter function may be determined based on a determination of the parameter at multiple locations along the dominant axis and an interpolation may be performed to determine the parameter function, as described above. For example, determining the parameter function may include determining the parameter with respect to the dominant axis based on an interpolation with respect to one or more of the first element points and one or more of the second element points.

Accordingly, the method 300 may be used to extract one or more parameters of an LPO from 3D data of a setting that may include the LPO. One skilled in the art will appreciate that the functions performed in the method 300 may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

For example, in some embodiments, the method 300 may include operations associated with determining a first coordinate transformation for the first element points. As described above, the first coordinate transformation may include a transformation, with respect to the first position along the dominant axis, from a global coordinate system associated with the point cloud to a local coordinate system associated with the direction axis and consequently the dominant axis. The method 300 may also include operations associated with determining a second coordinate transformation for the second element points. As also described above, the second coordinate transformation may include a transformation, with respect to the second position along the dominant axis, from the global coordinate system to the local coordinate system. In these or other embodiments, the method 300 may include operations associated with generating the parameter function based on the first coordinate transformation and the second coordinate transformation.

Additionally or alternatively, the method 300 may further include operations associated with determining a position of the dominant axis in the setting based on the first coordinate transformation and the second coordinate transformation. In these or other embodiments, determining the position of the dominant axis may include performing an interpolation (e.g., a spline interpolation) with respect to one or more of the first element points and one or more of the second element points. Further, the method 300 may include operations associated with adjusting the direction axis based on one or more of the first transformation and the second transformation. As indicated above, the adjustment of the direction axis may also be used to determine the position of the dominant axis. The direction axis may also be adjusted based on the interpolation.

Additionally or alternatively, the method 300 may include operations associated with determining a termination of the LPO. For example, the method 300 may include projecting, onto a third projection plane of a third projection volume, third points from the point cloud that are within the third projection volume and determining the termination of the LPO based on a quality metric associated with matching a cluster of the projected third points with the cross-section template.

In these or other embodiments, the method 300 may include operations associated with generating a model of the LPO based on the parameter function. In some embodiments, the method 300 may include generating a texture map of the model of the LPO with different colors that indicate a fit quality of the model of the LPO with respect to the LPO points. In these or other embodiments, the method 300 may include displaying the LPO points on the model of the LPO.

As used herein, the terms "module" or "component" may refer to specific hardware implementations configured to perform the actions of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" or "computing system" may include any number of hardware configurations, as previously defined herein, or any module or combination of modulates running on a hardware configuration. For example, a computing entity or computing system may include one or more processors and/or one or more computer-readable media in which the one or more processors and/or computer-readable media may be configured to collectively or individually perform the operations described herein.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
receiving a point cloud of three-dimensional (3D) data corresponding to a setting, wherein the 3D data includes a plurality of line parametric object (LPO) points that correspond to a line parametric object (LPO) included in the setting;
generating a first projection volume that corresponds to a three-dimensional extension of a first projection plane, wherein the first projection plane includes a first position along a dominant axis about which the LPO extends, the first projection plane is perpendicular to a direction axis at the first position, and the direction axis at least roughly corresponds to the dominant axis;
projecting, onto the first projection plane, first points from the point cloud that are within the first projection volume;
matching a plurality of the projected first points with a cross-section template that corresponds to the LPO to determine a plurality of first element points of a first primary projected element, wherein the first element points include a first plurality of LPO points;
generating a second projection volume that includes a second projection plane;
placing the second projection volume such that the second projection plane includes a second position along the dominant axis that is different from the first position, wherein placing the second projection volume is based on the direction axis such that the second projection plane is moved along the direction axis with respect to the first projection plane and is perpendicular to the direction axis at the second position;

projecting, onto the second projection plane, second points from the point cloud that are within the second projection volume;

matching a plurality of the projected second points with the cross-section template to determine a plurality of second element points of a second primary projected element, wherein the second element points include a second plurality of LPO points; and generating a parameter function based on the first element points and the second element points, wherein the parameter function expresses a parameter of the LPO as a function of position along the dominant axis.

2. The method of claim 1 further comprising:

determining a first coordinate transformation for the first element points, wherein the first coordinate transformation includes a transformation, with respect to the first position along the dominant axis, from a global coordinate system associated with the point cloud to a local coordinate system associated with the dominant axis;

determining a second coordinate transformation for the second element points, wherein the second coordinate transformation includes a transformation, with respect to the second position along the dominant axis, from the global coordinate system to the local coordinate system; and generating the parameter function based on the first coordinate transformation and the second coordinate transformation.

3. The method of claim 2, further comprising determining a position of the dominant axis in the setting based on the first coordinate transformation and the second coordinate transformation.

4. The method of claim 3, wherein determining the position of the dominant axis includes performing an interpolation with respect to one or more of the first element points and one or more of the second element points.

5. The method of claim 4, wherein the interpolation includes a spline interpolation.

6. The method of claim 2, further comprising adjusting the direction axis based on one or more of the first transformation and the second transformation.

7. The method of claim 1, further comprising determining the first primary projected element based on clustering of the projected first points.

8. The method of claim 1, further comprising determining the second primary projected element based on clustering of the projected second points.

9. The method of claim 1, further comprising generating the second projection volume based on the first projection volume.

10. The method of claim 1, further comprising:

receiving an initial point of the plurality of LPO points as an input; and generating the first projection volume such that the first projection plane includes the initial point.

11. The method of claim 1, further comprising receiving an indication of the direction axis as an input.

12. The method of claim 1, further comprising selecting a thickness of the first projection volume along the direction axis based on changes in a characteristic of the first primary projected element.

13. The method of claim 12, further comprising selecting the thickness based on a least amount of changes in the characteristic within a threshold thickness.

14. The method of claim 1, further comprising determining the cross-section template based on selecting a candidate cross-section template that substantially matches the first primary projected element.

15. The method of claim 1, further comprising receiving the cross-section template as an initial condition.

16. The method of claim 1, further comprising adjusting the direction axis based on a characteristic of the cross-section template.

17. The method of claim 1, further comprising adjusting the direction axis based on an interpolation with respect to one or more of the first element points and one or more of the second element points.

18. The method of claim 1, further comprising selecting the second position such that the first points and the second points include one or more of the same points from the point cloud.

19. The method of claim 1, further comprising selecting the second position such that the first points and the second points do not include one or more of the same points from the point cloud.

20. The method of claim 1, wherein determining the parameter function includes determining the parameter with respect to the dominant axis based on an interpolation with respect to one or more of the first element points and one or more of the second element points.

21. The method of claim 20, wherein the interpolation includes a spline interpolation.

22. The method of claim 1, further comprising:

projecting, onto a third projection plane of a third projection volume, third points from the point cloud that are within the third projection volume; and determining a termination of the LPO based on a quality metric associated with matching a cluster of the projected third points with the cross-section template.

23. The method of claim 1, further comprising generating a model of the LPO based on the parameter function.

24. The method of claim 23, further comprising generating a texture map of the model of the LPO with different colors that indicate a fit quality of the model of the LPO with respect to the LPO points.

25. The method of claim 24, further comprising displaying the LPO points on the model of the LPO.

* * * * *